United States Patent
Moore

(10) Patent No.: US 7,203,412 B2
(45) Date of Patent: Apr. 10, 2007

(54) ILLUMINATED ANTI-TRIP CABLE DUCT

(76) Inventor: Haskell Moore, 9502 Far Point Ct., Houston, TX (US) 77095

( * ) Notice: Subject to any disclaimer, the term of this patent is extended or adjusted under 35 U.S.C. 154(b) by 0 days.

(21) Appl. No.: 10/945,131

(22) Filed: Sep. 20, 2004

(65) Prior Publication Data

US 2005/0074223 A1   Apr. 7, 2005

Related U.S. Application Data

(60) Provisional application No. 60/504,864, filed on Sep. 22, 2003.

(51) Int. Cl.
- *G02B 6/00* (2006.01)
- *B61K 13/00* (2006.01)
- *E01B 7/28* (2006.01)

(52) U.S. Cl. ................ 385/147; 104/275

(58) Field of Classification Search ............ None
See application file for complete search history.

(56) References Cited

U.S. PATENT DOCUMENTS

| | | | |
|---|---|---|---|
| 4,530,865 A | 7/1985 | Sprenger | |
| 5,485,355 A * | 1/1996 | Voskoboinik et al. | 362/84 |
| 5,869,930 A * | 2/1999 | Baumberg et al. | 313/506 |
| 6,082,867 A * | 7/2000 | Chien | 362/84 |
| 6,237,198 B1 | 5/2001 | Jimenez | |
| 6,403,886 B1 | 6/2002 | Friberg | |
| 6,476,323 B2 | 11/2002 | Beebe et al. | |
| 6,499,410 B1 * | 12/2002 | Berardi | 104/275 |
| 6,596,943 B1 * | 7/2003 | Ward | 174/112 |
| 6,686,064 B2 * | 2/2004 | Nakamura | 428/690 |
| 6,753,096 B2 * | 6/2004 | Duggal et al. | 428/690 |
| 2002/0126473 A1 * | 9/2002 | Conti et al. | 362/84 |
| 2002/0149938 A1 | 10/2002 | Allen | |

FOREIGN PATENT DOCUMENTS

| | | | |
|---|---|---|---|
| JP | 4161008 A | 6/1992 | |
| JP | 5161228 A | 6/1993 | |

OTHER PUBLICATIONS

Adakawa et al., 1981, "Manufacture of Thermoplastic Resin Mating Product Having Standard Length" translated abstract and constitution.*

* cited by examiner

*Primary Examiner*—Michelle Connelly-Cushwa
*Assistant Examiner*—Chris Chu
(74) *Attorney, Agent, or Firm*—Charles Saron Knobloch

(57) ABSTRACT

The present invention provides a pleasant illuminated anti-trip cable duct for use in protecting wires that cross pathways. The illuminated anti-trip cable duct may also be used to illuminate raceways or paths, such as aisles in auditoriums or churches. The anti-trip cable duct incorporates an integrated light transmission window and electroluminescent wire. Installation is straightforward and very similar to installation of standard, non-illuminated cable duct. Unlike rope or string lighting, which may not be arbitrarily cut, the present invention may be cut to any arbitrary length at the job site, provided that a minimum length is used. Lengths of the present invention may be cascaded together, enabling long illumination runs. The present invention may be provided in rolled lengths, adding to ease in shipping, warehousing, and job site installation. Little additional skills are required for installation, making the present invention an attractive alternative to typical non-illuminated anti-trip duct.

12 Claims, 2 Drawing Sheets

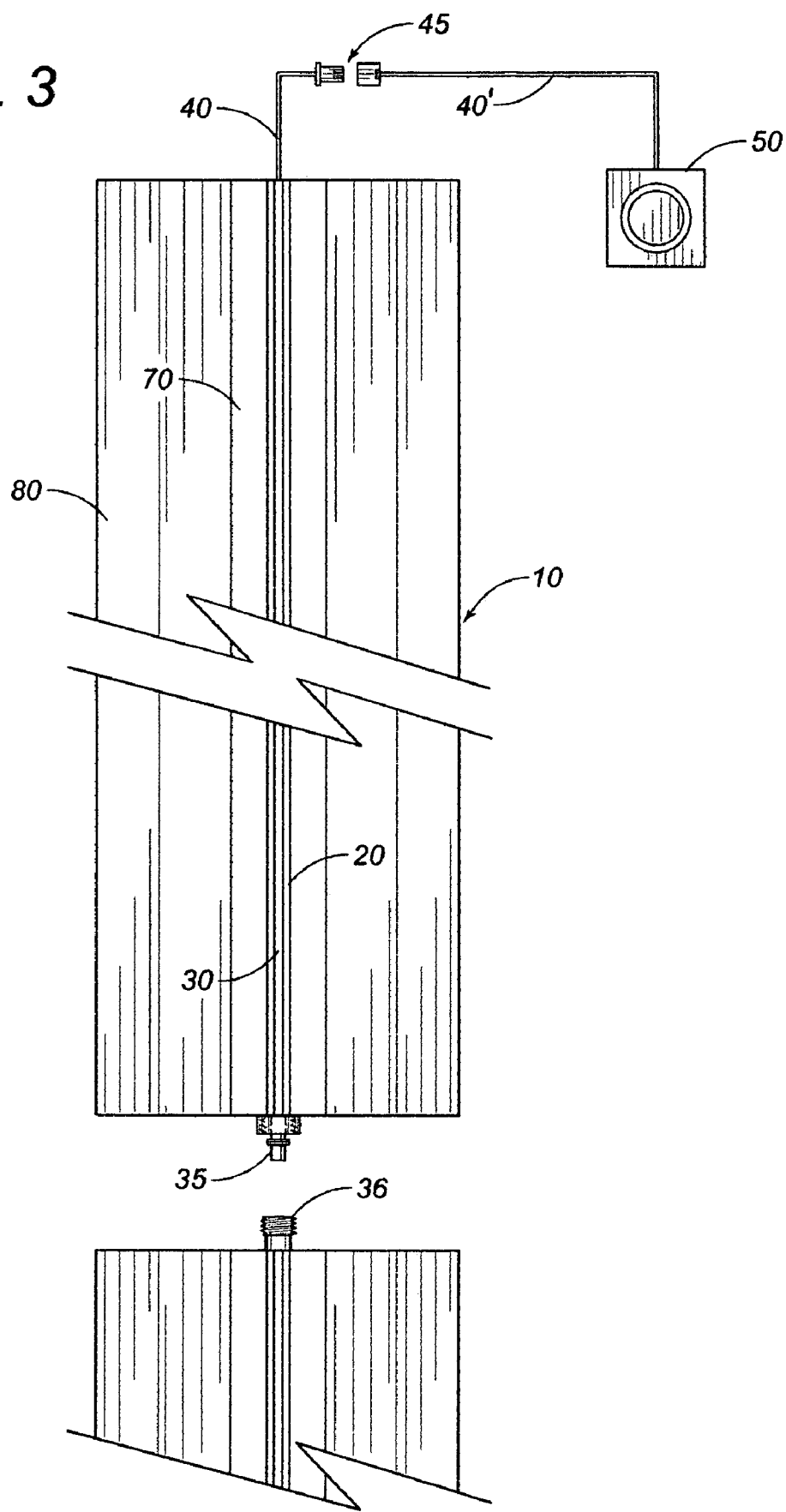

ILLUMINATED ANTI-TRIP CABLE DUCT

REFERENCE

Pursuant to 35 U.S.C. 119(e)(1), reference is hereby made to earlier filed provisional Patent Application No. 60/504,864 to Haskell Moore for Illuminated Anti-Trip Cable Duct of filing date Sep. 22, 2003.

FIELD OF THE INVENTION

The present invention relates generally to devices that reduce any tripping hazard from laid cables.

BACKGROUND OF THE INVENTION

The present invention improves common ducted cord covers used to conceal electronic cables or hoses. Typical names for ducted cord covers include "cable cover", "cord cover", "cord protector", "raceway" and "cable duct". The common cable duct is typically a semi-flexible piece of material with a channel that allows a cable or hose to be concealed inside.

The purpose of a cable duct is to minimize the trip hazard and protect cables or hoses when they are lying on the floor and situated in a location where people could reasonably be expected to come in contact with them. While the common cable duct is intended to minimize trip hazard, the cable duct itself often presents a trip hazard, since it is designed to lie almost flat on the floor and is typically manufactured out of material that is usually neutral in color.

Typical anti-trip cable duct may be custom cut to length during installation at the job site. Prior to the present invention, it has been impractical to incorporate illumination in such cable duct. The reason for this impracticality is that the wires that would carry power to light bulbs would be cut at an arbitrary point, causing an open circuit or a shorted circuit and the lighting would fail. While there may be long felt need for a versatile illuminated cable duct, the limitations of typical rope or string lighting have prevented reaching a practical solution.

BRIEF SUMMARY OF THE INVENTION—OBJECTS AND ADVANTAGES

It is an object of the present invention to provide an illuminated anti-trip cable duct that can also be cut to a desired length without harm to the illumination source. The minimum cut length is approximately three feet, depending on the configuration of the illumination's power source. The present invention has the advantage of allowing custom lengths to be cut during field installation, reducing manufacture and marketing costs associated with custom ordering or maintaining a wide range of lengths.

It is an object of the present invention to optionally provide the ability to cascade multiple sections together. This increases the versatility during field installation, where a single section may have one or more additional sections attached to allow coverage over a greater distance.

It is an object of the present invention to optionally provide a variety of choices in illumination color to match the desires of the customer. Currently, there are ten or more colors of the illumination source readily available. While any of these available colors may be used, a lime-green has been found to have the advantage of apparently providing an optimum visibility and recognition.

It is an object of the present invention to optionally provide variations in the style of illumination. Special drivers for the illumination source are available that cause the illumination source to flash or pulsate, adding to the recognition of the potential trip hazard.

Many personal computer cases feature lighting for cosmetic purposes. An advantage of the present invention is that it is generally possible to match the illumination color to that of the personal computer lighting. Different aesthetic effects may be achieved, as color matching is possible. This is particularly desirable for persons or offices sensitive to interior decoration and style.

A major advantage of the present invention is that the illumination source provides a balance between visibility and distraction. The illumination source provides adequate intensity to be highly visible, especially in low-light conditions. While visible, the illumination source does not pose a significant distraction, maintaining suitability for use in conference rooms, churches, hospitals, theaters, offices, et cetera.

An advantage of the present invention is that its installation may be either temporary or permanent. The illuminated cable duct is flexible enough to be packaged, stored, and transported in a roll. At the job site, the cable duct may be unrolled, then laid out flat on the floor.

BRIEF SUMMARY OF THE INVENTION

The present invention provides a pleasant illuminated anti-trip cable duct for use in protecting wires that cross pathways. The illuminated anti-trip cable duct may also be used to illuminate raceways or paths, such as aisles in auditoriums or churches.

The anti-trip cable duct incorporates an integrated light transmission window and electroluminescent wire. Installation is straightforward and very similar to installation of standard, non-illuminated cable duct.

Unlike rope or string lighting, which may not be arbitrarily cut, the present invention may be cut to any arbitrary length at the job site, provided that a minimum length is used.

Lengths of the present invention may be cascaded together, enabling long illumination runs.

There are several choices in illumination color, allowing an aesthetic match to the decor of the surroundings. Optionally, the illumination may be programmed to blink, flash, or run through a programmed sequence of events.

The power source may be from an internal battery pack or an external power supply, extending the range of applications for the present invention.

The present invention may be provided in rolled lengths, adding to ease in shipping, warehousing, and job site installation. Little additional skills are required for installation, making the present invention an attractive alternative to typical non-illuminated anti-trip duct.

BRIEF DESCRIPTION OF THE SEVERAL VIEWS OF THE DRAWING

The present invention and its advantages will be better understood by referring to the following detailed description and the attached drawings in which:

FIG. 3 shows a plan view of the cable duct, extension connectors, and power source.

REFERENCE NUMERALS IN DRAWINGS

| | |
|---|---|
| 10 | cable duct |
| 20 | illumination source channel |
| 30 | electroluminescent wire |
| 35 | male extension connector |
| 36 | female extension connector |
| 40, 40' | power wires |
| 45 | inverter connector |
| 50 | inverter |
| 70 | light transmission window |
| 80 | stock material |
| 90 | cable |
| 100 | cable compartment |

DETAILED DESCRIPTION OF THE INVENTION

While the invention will be described in connection with its preferred embodiments, it will be understood that the invention is not limited thereto. On the contrary, it is intended to cover all alternatives, modifications, and equivalents, which may be included within the spirit and scope of the invention, as defined by the appended claims.

Figure 1:
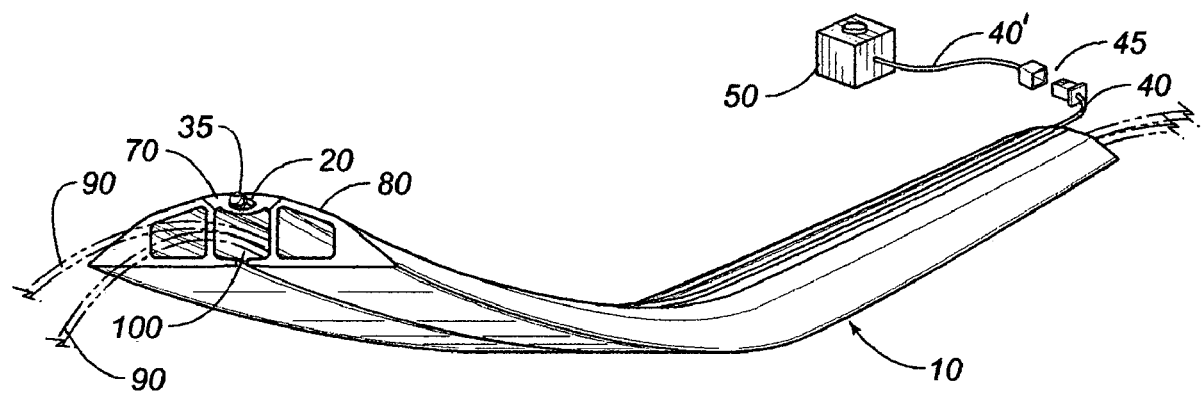
FIG. 1 shows a 3-D perspective view of the present invention designed into a typical cable duct.
Figure 2:
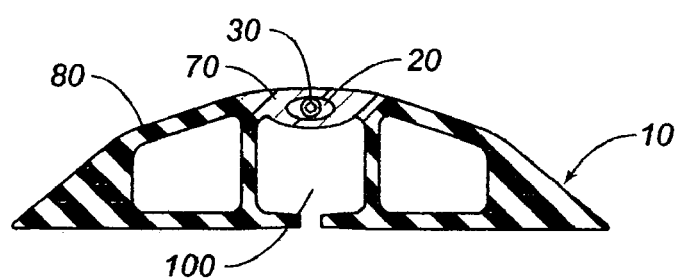
FIG. 2 shows a cross section view of the cable duct, showing cable compartment and illumination source channel.

A typical embodiment of the present invention is illustrated in FIG. 1, FIG. 2, and FIG. 3. In FIG. 1, cable duct 10 is shown with a cable compartment 100 running longitudinally along the axis of cable duct 10. Cables 90 are shown protruding from cable compartment 100. Cable 90 represents one or more cables which cable duct 10 is designed to protect. A portion of cable duct 10 is manufactured with a light transmission window 70 composed of a light transmitting material and running longitudinally along the axis of, and typically on the top side of, cable duct 10. Light transmission window 70 may be composed of any material capable of transmitting light. The remainder of cable duct 10 is manufactured of stock material 80. In the preferred embodiment, light transmission window 70 and stock material 80 are composed of materials capable of being formed by typical extrusion molding processes. Illumination source channel 20 runs longitudinally along the axis of, and resides at least adjacent to, light transmission window 70.

As shown in cross section FIG. 2 and plan view FIG. 3, electroluminescent wire 30 runs longitudinally along the axis of, and resides within, illumination source channel 20. Electroluminescent wire 30 is typically called "cold cathode neon" and features the property that it can generally be cut to length without harm to its illumination properties. In the preferred embodiment, electroluminescent wire 30 is manufactured by Electroluminescent Industries, Ltd. of Jerusalem, Israel under the trademark "LyTec" and distributed by Projekt-Lit of Portland, Oreg. as model "Phat" (3.2 mm wire size), color "L" (lime-green). An alternative distributor is Elam USA, Inc. of Port Washington, N.Y. The 3.2 mm wire size provides more plastic coating than the average 2.3 mm wire size electroluminescent wire and provides additional durability and protection for the internal components of the wire. The light generated by electroluminescent wire 30 is able to penetrate through light transmission window 70 into the space exterior to cable duct 10. Electroluminescent wire 30 is connected to wires 40. Wire 40 connects to inverter connector 45. Inverter connector 45 connects by additional wires 40' to inverter 50. Inverter 50 is a power source, typically providing approximately 120 volts alternating at a frequency of approximately 2000 Hertz. Depending upon desired electroluminescent characteristics, the power source can range from at least 40 volts to 120 volts and 200 Hertz to 4000 Hertz.

As shown in cross-section FIG. 2, cable duct 10 is redesigned to incorporate a light transmission window 70 composed of a light transmitting material and molded into a typical cable duct, said light transmission window 70 running lengthwise generally on the top side of said cable duct 10. Light transmission window 70 is conformed within cable duct 10 to prevent it from presenting an additional trip hazard. Illumination source channel 20 is at least partially enclosed by light transmission window 70, said illumination source channel 20 being approximately 0.20 inches inner diameter. A length of high-visibility, electroluminescent wire 30 is placed in illumination source channel 20.

As shown in plan view FIG. 3, one end of electroluminescent wire 30 is connected to male extension connector 35. A second cable duct 10 contains a second electroluminescent wire 30 connected to a female extension connector 36. The choice of male and female extension connectors may be reversed, or a symmetrical (sexless) connector may be used. The choice of connection means is not critical to the operation of the present invention.

The Illuminated Anti-Trip Cable Duct, cable duct 10, is manufactured by a two-color extrusion process. The top of cable duct 10 incorporating illumination source channel 20 and light transmission window 70, is composed of any light transmitting material. The remainder of cable duct 10 is composed of any stock material 80, such as standard gray, black, brown, or some other opaque, transparent, or translucent plastic. The two materials are permanently molded together. This is accomplished by using an extrusion mold and process that injects clear or translucent plastic on the top (for the illuminated section), and any desired color for the remainder of the cable duct.

In an alternate embodiment, inverter 50 is contained within cable duct 10. A separate battery pack, an internal battery, or a common low-voltage transformer powers inverter 50.

In an alternate embodiment, batteries are used to power inverter 50 and are located a safe distance away to avoid becoming a trip hazard.

In a further alternate embodiment, inverter 50 is plugged into a conventional electrical outlet and powered by line current. In this configuration, the device may be left in place for an extended period of time.

DETAILED DESCRIPTION OF THE INVENTION—OPERATION

In typical operation, cable duct 10 is laid out flat on a floor. Inverter 50 is energized, providing power to electroluminescent wire 30 by way of wires 40. In this manner, illumination source channel 20 illuminates, causing at least the light transmission window 70 of cable duct 10 to be significantly more visible than conventional cable ducts, especially in low light conditions. The illumination tends to attract attention to the potential trip hazard, even from the peripheral vision, and thereby reduces the likelihood of someone tripping over cable duct 10. When cold-cathode neon is used, electroluminescent wire 30 has an estimated life of at least approximately 1500 to 2000 hours of continuous use, before it begins to dim.

Although the description above contains many specifications, these should not be construed as limiting the scope of the invention but as merely providing illustrations of some of the presently preferred embodiments of this present invention. Persons skilled in the art will understand that the method and apparatus described herein may be practiced, including but not limited to, the embodiments described. Further, it should be understood that the invention is not to be unduly limited to the foregoing which has been set forth for illustrative purposes. Various modifications and alternatives will be apparent to those skilled in the art without departing from the true scope of the invention, as defined in the following claims. While there has been illustrated and described particular embodiments of the present invention, it will be appreciated that numerous changes and modifications will occur to those skilled in the art, and it is intended in the appended claims to cover those changes and modifications which fall within the true spirit and scope of the present invention.

Thus, the scope of the invention should be determined by the appended claims and their legal equivalents, rather than by the examples given.

What I claim as my invention is:

1. A flexible, illuminated anti-trip cable duct, comprising:
    a first longitudinally extending side, said first longitudinally extending side forming a generally flat surface along a first axial direction and a second axial direction, the second axial direction extending longitudinally and generally perpendicular to the first axial direction;
    a second longitudinally extending side opposing said first longitudinally extending side, said second longitudinally extending side forming a generally semi-circular surface along said first axial direction;
    a flexible body formed of the volume enclosed by said first longitudinally extending side and said second longitudinally extending side, said body flexible in a third axial direction generally perpendicular to said first axial direction and said second axial direction;
    a cable compartment extending longitudinally along said second axial direction within said body of the duct;
    a light transmission window extending longitudinally along said second axial direction of said second longitudinally extending side, said light transmission window conformed within said generally semi-circular surface of said second longitudinally extending side, thereby presenting an uninterrupted smooth surface;
    an illumination source channel extending longitudinally along said second axial direction of said second longitudinally extending side, said illumination source channel at least partially enclosed by said light transmission window;
    a flexible, severable electroluminescent wire extending longitudinally along said second axial direction of said second longitudinally extending side and disposed within said illumination source channel; and
    means for supplying electricity to said electroluminescent wire.

2. The flexible, illuminated anti-trip cable duct of claim 1 wherein said illumination source channel is approximately 0.2 inch diameter.

3. The flexible, illuminated anti-trip cable duct of claim 1 wherein said electricity supplying means comprises an inverter providing between 40 volts and 120 volts at a frequency of between 200 Hertz and 4000 Hertz.

4. The flexible, illuminated anti-trip cable duct of claim 1 wherein said electroluminescent wire is approximately 3.2 mm wire size.

5. The flexible, illuminated anti-trip cable duct of claim 1 wherein said electricity supplying means comprises an inverter contained within said cable duct.

6. The flexible, illuminated anti-trip cable duct of claim 1 wherein said electricity supplying means comprises an inverter powered by a battery.

7. The flexible, illuminated anti-trip cable duct of claim 1 wherein said electricity supplying means comprises an inverter powered by an external power supply.

8. The flexible, illuminated anti-trip cable duct of claim 1 wherein said electricity supplying means comprises conventional power mains.

9. The flexible, illuminated anti-trip cable duct of claim 1 wherein said electricity supplying means comprises an extension connector.

10. The flexible, illuminated anti-trip cable duct of claim 1 wherein said electricity supplying means comprises an inverter, wherein said inverter provides a changing pattern of power to said electroluminescent wire.

11. The flexible, illuminated anti-trip cable duct of claim 10 wherein said changing pattern of power is a preprogrammed pattern.

12. The flexible, illuminated anti-trip cable duct of claim 1, further comprising connection means attached an end of said electroluminescent wire.

* * * * *